United States Patent
Chen et al.

(10) Patent No.: US 10,429,965 B2
(45) Date of Patent: Oct. 1, 2019

(54) FLEXIBLE POLARIZER AND FLEXIBLE TOUCH DISPLAY

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Chun-Jen Chen, Guangdong (CN); Tzu-Hsiang Lin, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 0 days.

(21) Appl. No.: 15/721,969

(22) Filed: Oct. 2, 2017

(65) Prior Publication Data

US 2019/0064412 A1  Feb. 28, 2019

(30) Foreign Application Priority Data

Aug. 25, 2017  (CN) .......................... 2017 1 0740800

(51) Int. Cl.
*G06F 3/041* (2006.01)
*G02B 5/30* (2006.01)
*G02B 1/14* (2015.01)

(52) U.S. Cl.
CPC ............... *G06F 3/041* (2013.01); *G02B 1/14* (2015.01); *G02B 5/3033* (2013.01); *G06F 2203/04102* (2013.01)

(58) Field of Classification Search
None
See application file for complete search history.

(56) References Cited

U.S. PATENT DOCUMENTS

| 2001/0022632 | A1* | 9/2001 | Umemoto | G02F 1/13338 349/12 |
| 2004/0233348 | A1* | 11/2004 | Mai | G02B 6/0056 349/69 |
| 2008/0057228 | A1* | 3/2008 | Horie | G02B 5/0215 428/1.32 |
| 2012/0275024 | A1* | 11/2012 | Marzen | G02F 1/133528 359/488.01 |
| 2014/0183473 | A1* | 7/2014 | Lee | H01L 51/0097 257/40 |
| 2016/0223719 | A1* | 8/2016 | Ishiguro | B32B 7/02 |

* cited by examiner

*Primary Examiner* — Nicholas J Lee
(74) *Attorney, Agent, or Firm* — CKC & Partners Co., LLC (57) ABSTRACT

The disclosure provides a flexible polarizer, including a polarizing layer, a first protective layer, and a second protective layer. The polarizing layer has a first surface and a second surface opposite to each other. The first protective layer is disposed on the first surface and comprises polyvinylidene difluoride (PVDF) or a kind of high phase retardation plastics. The second protective layer is disposed on the second surface and comprises PVDF or a kind of the high phase retardation plastics. The first protective layer, the second protective layer, and the polarizing layer are configured to be bent along a bend line.

16 Claims, 6 Drawing Sheets

FLEXIBLE POLARIZER AND FLEXIBLE TOUCH DISPLAY

CROSS-REFERENCE TO RELATED APPLICATION

This application claims priority to China Application Serial Number 201710740800.0, filed Aug. 25, 2017, which is herein incorporated by reference.

BACKGROUND

Field of Invention

The present invention relates to a flexible polarizer and a flexible touch device.

Description of Related Art

A polarizer is a core element in a display device. The main structure of a polarizer includes a polarizing layer and two protective layers covering each side of the polarizing layers. The main stream materials used for the polarizing layer and the protective layers are polyvinylidene difluoride (PVA) and tri-cellulose acetate (TAC) respectively. The TAC has advantages such as extremely high transparency. However the TAC is relative fragile and inflexible, making it not available in some designs of flexible touch device.

SUMMARY

The present disclosure provides a flexible polarizer, including a polarizing layer, a first protective layer, and a second protective layer. The polarizing layer has a first surface and a second surface opposite to each other. The first protective layer is disposed on the first surface and includes polyvinylidene difluoride (PVDF) or a kind of high phase retardation plastics. The second protective layer is disposed on the second surface and includes PVDF or a kind of the high phase retardation plastics. The first protective layer, the second protective layer, and the polarizing layer are configured to be bent along a bend line.

In some embodiments of the present disclosure, an angle between an optical axis of the first protective layer and an optical axis of the second protective layer is smaller than 15 degrees.

In some embodiments of the present disclosure, the first protective layer and the second protective layer both include PVDF.

In some embodiments of the present disclosure, at least one of the first protective layer and the second protective layer further includes at least one of polymethylmethacrylate (PMMA), triacetate Cellulose (TAC), polyimide (PI), polyethylene terephthalate (PET), and polypropylene (PP).

In some embodiments of the present disclosure, at least one of the first protective layer and the second protective layer has a thickness less than 80 um, and at least one of the first protective layer and the second protective layer has a phase retardation less than 15 nm.

In some embodiments of the present disclosure, the first protective layer and the second protective layer respectively include said kinds of the high phase retardation plastics, and materials of said kinds of the high phase retardation plastics include at least one selected from a group consisting of PMMA, PI, PET, PP, polyethylene (PE), polyethylene furanoate (PEF), and polyethylene naphthalate (PEN).

In some embodiments of the present disclosure, at least one of the first protective layer and the second protective layer has a thickness in a range from 40 um to 120 um, and at least one of the first protective layer and the second protective layer has a phase retardation in a range from 7500 nm to 12000 nm.

In some embodiments of the present disclosure, at least one of the first protective layer and the second protective layer is an oriented layer, wherein an extrude direction of the oriented layer is perpendicular to the bend line.

In some embodiments of the present disclosure, the first protective layer includes PVDF, and the second protective layer includes said kind of the high phase retardation plastics.

In some embodiments of the present disclosure, the first protective layer further includes at least one of PMMA, PI, PET, PP, and TAC.

In some embodiments of the present disclosure, the second protective layer is said kind of the high phase retardation plastics, and materials of said kind of the high phase retardation plastics of the second protective layer include at least one selected from a group consisting of PMMA, PI, PET, PP, and TAC.

In some embodiments of the present disclosure, a thickness of the first protective layer is less than 80 um, a phase retardation of the first protective layer is less than 15 nm, a thickness of the second protective layer is in a range from 40 um to 120 um, and a phase retardation of the second protective layer is in a range from 7500 nm to 12000 nm.

In some embodiments of the present disclosure, the second protective layer is an oriented layer, wherein an extrude direction of the oriented layer is perpendicular to the bend line.

In some embodiments of the present disclosure, the polarizing layer includes polyvinyl alcohol (PVA).

The disclosure provides a flexible touch device including an aforementioned flexible polarizer, a touch panel, and a display module. The touch panel includes a glass covering layer, a shielding layer, and a sensor layer, wherein the shielding layer is disposed between the glass covering layer and the sensor layer. The flexible polarizer is disposed between the touch panel and the display module.

In some embodiments of the present disclosure, the first protective layer is adjacent to the touch panel, and the second protective layer is adjacent to the display module.

In some embodiments of the present disclosure, the first protective layer is adjacent to the display module, and the second protective layer is adjacent to the touch panel.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
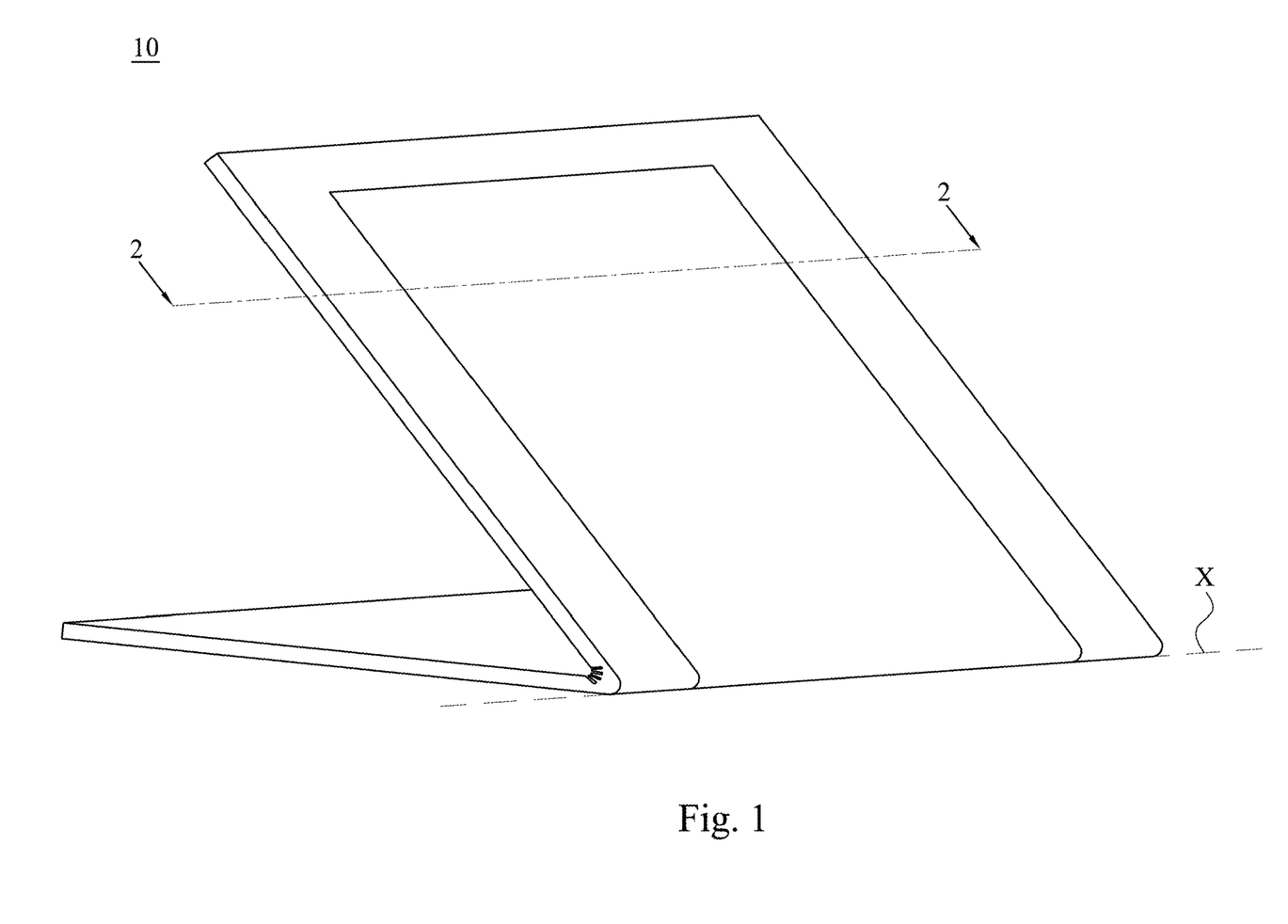
FIG. 1 illustrates a three-dimensional view of a flexible touch device according to an embodiment of the present disclosure.

Please refer to FIG. 1. FIG. 1 illustrates a three-dimensional view of a flexible touch device 10 according to an embodiment of the present disclosure. Wherein the flexible touch device 10 may be bent along a bend line X.

Figure 2:
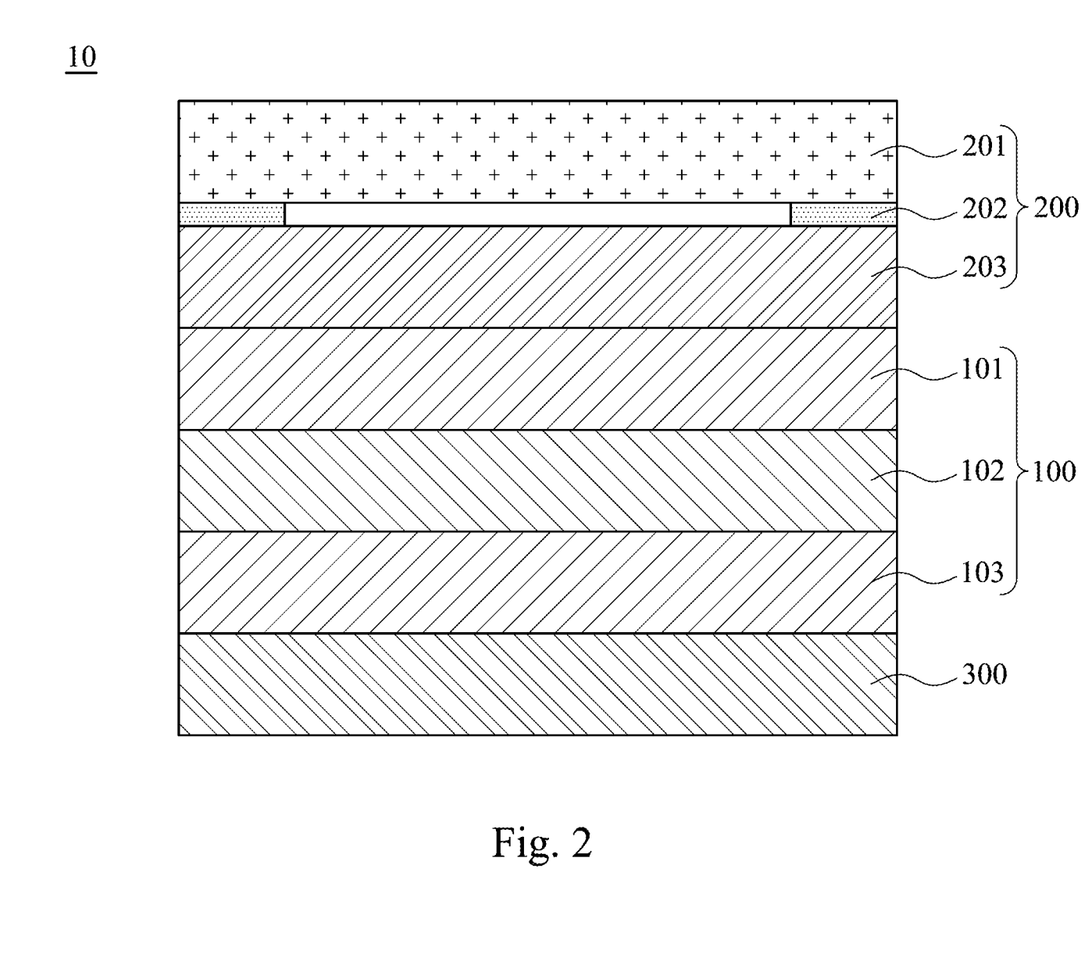
FIG. 2 illustrates a cross-sectional view of the flexible touch device shown in FIG. 1 viewed along a line 2-2.

Please refer to FIG. 2. FIG. 2 illustrates a cross-sectional view of the flexible touch device 10 shown in FIG. 1 viewed along a line 2-2. As the embodiment of FIG. 2 shows, the flexible touch device 10 includes a polarizer 100, a touch panel 200, and a display module 300. The polarizer 100 includes a first protective layer 101, a polarizing layer 102, and a second protective layer 103. The touch panel 200 includes a glass covering layer 201, a shielding layer 202, and a sensor layer 203.

As the embodiment of FIG. 2 shows, the glass covering layer 201 is a soft glass layer. The soft glass layer has good heat endurance and relative thin thickness, and the soft glass layer makes it possible to increase the hardness of the stylus which matches with the flexible touch device 10. More particular, the soft glass layer may be made of inorganic materials or transparent resins. Transparent resins, for example, may be made of organic macromolecules such as silsesquioxane and/or an organic matrix.

As the embodiment of FIG. 2 shows, the shielding layer 202 may be made of opaque materials such as inks, color resist, organic or inorganic materials (ex, black matrix). The shielding layer 202 may be disposed at the periphery of the glass covering layer 201, so as to shield the circuit disposed within the flexible touch device 10.

As the embodiment of FIG. 1 shows, the sensor layer 203 may include a resistive sensor structure, a capacitive sensor structure, or an electro-magnetic sensor structure. For example, if a capacitive sensor structure is implemented, the sensor layer 203 may further include an X-axis electrode, a Y-axis electrode, an indium tin oxide (ITO) layer, and a conductive glass layer etc. The flexible substrate may be a plastic substrate or ultra-thin flexible glass substrate.

As the embodiment of the FIG. 2 shows, the display module 300 may be a liquid crystal module (LCM) utilizing a flexible substrate, wherein the flexible substrate may be a plastic substrate or an ultra-thin flexible glass substrate. In some embodiments, the display module 300 may be an organic light emitting diode (OLED) module utilizing the flexible substrate.

As the embodiment of the FIG. 2 shows, the first protective layer 101 is adjacent to the touch panel 200, and the second protective layer 103 is adjacent to the display module 300. In some embodiments, the first protective layer 101 is adjacent to the touch panel 200, and the second protective layer 103 is adjacent to the display module 300. In other words, the polarizer 100 in FIG. 2 may be disposed upside down.

Figure 3:
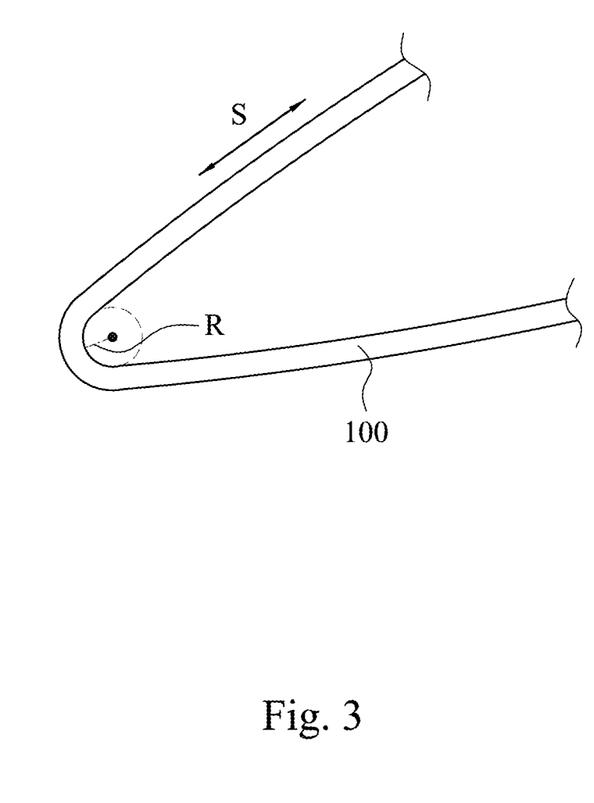
FIG. 3 illustrates a cross-sectional view of the polarizer shown in FIG. 2 being bent.

Please refer to FIG. 3. FIG. 3 illustrates a cross-sectional view of the polarizer 100 shown in FIG. 2 being bent. The polarizer 100 shown in FIG. 3 is bent along the bend line X (please refer to FIG. 1). In some embodiments, the bending radius of bent polarizer 100 ranges from 1 mm to 6 mm. In other embodiments, the polarizer 100 may be configured to be bent along an opposite direction, or the polarizer 100 may be configured with multiple bend lines.

As the embodiment of FIG. 1 and FIG. 2 shows, the polarizing layer 102 may include polyvinyl alcohol (PVA). But the present disclosure is not limited as aforementioned, other polarizing layer 102 with polarizing property may also be used.

Figure 4A:
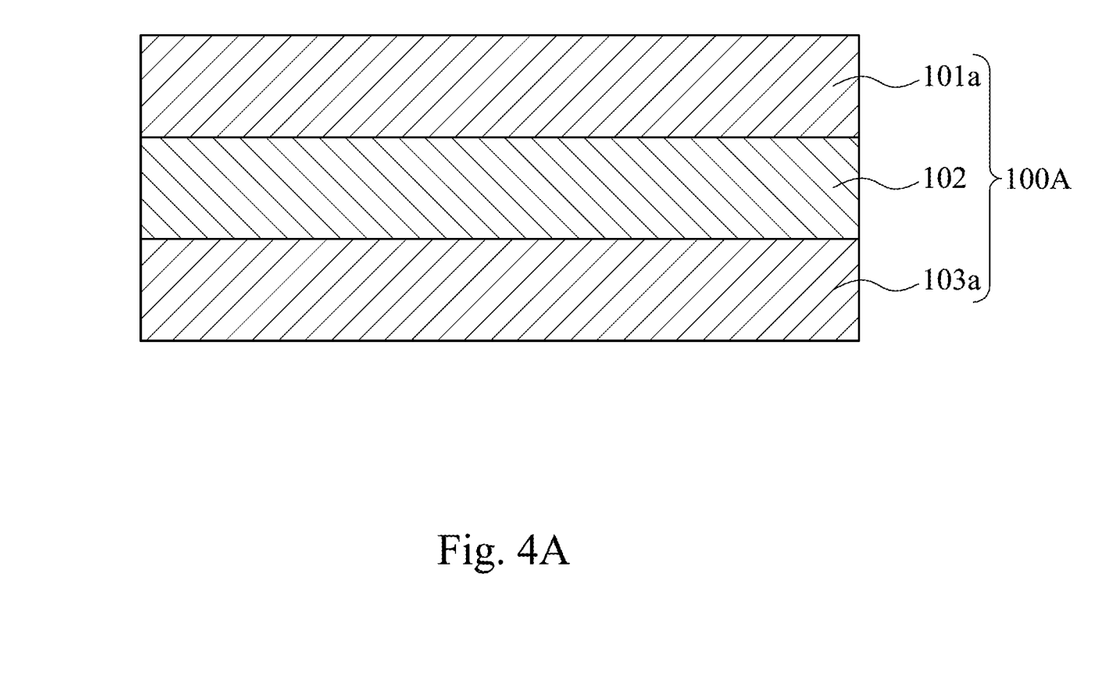
FIG. 4A to FIG. 4C illustrate cross-sectional views of the polarizer shown in FIG. 2 with different protective layer.
Figure 4B:
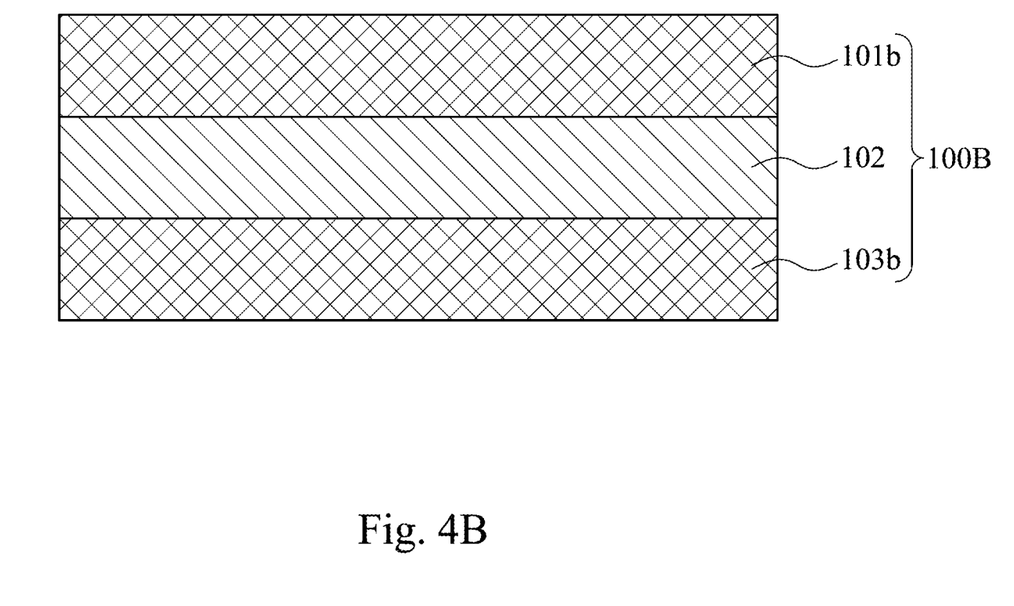
Figure 4C:
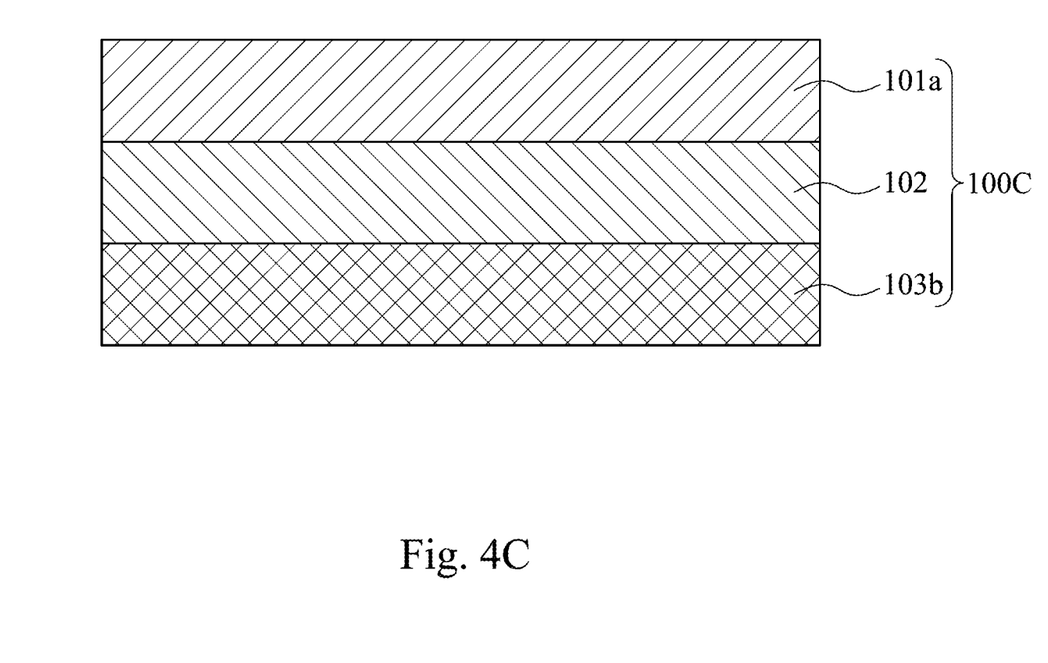

Please refer to FIG. 4A to FIG. 4C. FIG. 4A to FIG. 4C illustrate cross-sectional views of the polarizer 100 shown in FIG. 2 with different protective layer.

Please refer to FIG. 4A. As the embodiment of 4A shows, the first protective layer 101a and the second protective layer 103a both include polyvinylidene difluoride (PVDF). More particular speaking, in the embodiment of FIG. 4A, the first protective layer 101a or the second protective layer 103a further includes compounds such as polymethylmethacrylate (PMMA), triacetate cellulose (TAC), polyimide (PI), polyethylene terephthalate (PET), polypropylene (PP), and combination thereof. In some embodiments, the first protective layer 101a and the second protective layer 103a may include same materials with same composition ratio. In some embodiments, the first protective layer 101a and the second protective layer 103a may include different materials with different composition ratio. By modulating the difference between the first protective layer 101a and the second protective layer 103a, properties of polarizer 100A such as humidity, permeability, flexibility, hardness, and flexibility may be changed to meet various practical needs.

As the embodiment of FIG. 4A shows, the thickness of the first protective layer 101a or the thickness of the second protective layer 103a may be smaller than 80 um, and the phase difference of the first protective layer 101a and the phase difference of the second protective layer 103a may be less than 15 nm. In better embodiment of the present disclosure, the phase difference of the first protective layer 101a and the phase difference of the second protective layer 103a may be less than 3 nm, thus avoiding the phase difference may cause undesired effects such as rainbow effect.

As the embodiment of FIG. 4A shows, the first protective layer 101a and the second protective layer 103a both include PVDF. Since PVDF is flexible and possesses low phase difference property, the polarizer 100A becomes rainbow-free, thin and light-weighted, and flexible.

Please refer to FIG. 4B. As the embodiment of 4B shows, the first protective layer 101b and the second protective layer 103b both include high phase retardation plastics. More particularly speaking, the first protective layer 101b or the second protective layer 103b include high phase retardation plastics such as PMMA, PI, PET, PP, polyethylene (PE), polyethylene furanoate (PEF), polyethylene naphthalate (PEN), other plastic materials with high phase retardation property, or combination thereof. In some embodiments, the first protective layer 101b and the second protective layer 103b may include same materials with same composition ratio. In some embodiments, the first protective layer 101b and the second protective layer 103b may include different materials with different composition ratio. By modulating the difference between the first protective layer 101b and the second protective layer 103b, properties of polarizer 100B such as humidity, permeability, flexibility, hardness, and flexibility may be changed to meet various practical needs.

As the embodiment of FIG. 4B shows, the thickness of the first protective layer 101b and the thickness of the second protective layer 103b may range from 40 um to 120 um, and the phase difference of the first protective layer 101b or the phase difference of the second protective layer 103b may range from 7500 nm to 12000 nm. If a device possesses phase difference larger than 6000 nm, intensive rainbow effect will be generated and cause severe visual interference to the user. However if the phase difference ranges from 7500 nm to 12000 nm, the rainbow effect being generated is rather sparse, thus the visual interference is relatively small. In addition, after the polarized light passing through a medium with a phase retardation property, the polarization mode of the polarized light will be changed. For example, if the light passing through the first protective layer 101b, polarizing layer 102, and the second protective layer 103b in order, the polarized light will end up as an elliptically polarized light after passing through the second protective layer 103b. The resulting elliptically polarized light enables the device to be still visible under certain polarization circumstances. For example, without an additional quarter wave plate, users with polarizing sunglasses can still recognize original messages from the device.

As the embodiment of FIG. 4B shows, the first protective layer 101b and the second protective layer 103b may be oriented layers, and the extrude direction S (shown in FIG. 3) is perpendicular to the bend line X. Since the oriented layer is stronger when being folded towards the extrude direction S, the first protective layer 101b and the second protective layer 103b is stronger when folded along the bend line X.

As the embodiment of FIG. 4B shows, the first protective layer 101b and the second protective layer 103b both include high phase retardation plastics with high phase retardation property and flexibility, the polarizer 100B thus become flexible and the rainbow effect of the polarizer 100B is reduced.

Please refer to FIG. 4C. As the embodiment of FIG. 4C shows, the first protective layer 101a includes PVDF, and the second protective layer 103b includes high phase retardation plastics. More particularly, in the embodiment of FIG. 4C, the first protective layer 101a not only includes PVDF, but also further includes polymer of PMMA, TAC, PI, PET, PP and combination thereof. More particularly speaking, in the embodiment of FIG. 4C, the second protective layer 103b may include PMMA, PI, PET, PP, PE, PEF, PEN, or any plastics with high phase retardation property, or combination thereof.

As the embodiment of FIG. 4C shows, the thickness of the first protective layer 101a may be smaller than 80 um, and the phase difference of the first protective layer 101a may be less than 15 nm. As the embodiment of FIG. 4C shows, the thickness of the second protective layer 103b may range from 40 um to 120 um, and the phase difference of the second protective layer 103b may range from 7500 nm to 12000 nm. The properties of the first protective layer 101a and the second protective layer 103b have already been described as aforementioned, thus not repeat herein.

As the embodiment of FIG. 4C shows, the second protective layer 103b may be an oriented layer, and the extrude direction S (see FIG. 3) is perpendicular to the bend line X. Since the oriented layer are stronger when being folded towards the extrude direction S, the first protective layer 101a and the second protective layer 103b is stronger when folded along the bend line X.

As the embodiment of FIG. 4C shows, since the first protective layer 101a and the second protective layer 103b of polarizer 100C respectively includes PVDF and high phase retardation plastics, polarizer 100C includes advantages of both. For example, polarizer 100C includes advantages of PVDF such as light-weight and high transparency, and includes advantages of high phase retardation plastics such as being visible under polarized circumstances and omission of the quarter-wave plate.

As the embodiments of FIG. 4A to FIG. 4C show, the first protective layer 101a,101b have an optical angle A1 (not shown), and the second protective layer 103a, 103b have an optical angle A2 (not shown). The optical angle A1 is the angle between the fast axis of the first protective layer 101a, 101b and the polarization direction of the polarizing layer 102. The optical angle A2 is the angle between the fast axis of the second protective layer 103a, 103b and the polarization direction of the polarizing layer 102. A polarizer with a high optical angle may result in problems such as glares and/or rainbow effects, however in the embodiments of FIG. 4A to FIG. 4C, both the optical angle A1 and the optical angle A2 are set to be smaller than 15 degrees, thus the polarizers 100A-C are free of the aforementioned problems.

The polarizer 100 of the present disclosure may adopt PVDF and/or high phase retardation plastics according to practical needs. Thus it will not only greatly improve the flexibility of the final product, problems such as rainbow effect, glare, and invisibility under polarized circumstances may also be overcome.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A flexible polarizer, comprising:
   a polarizing layer having a first surface and a second surface opposite to each other;
   a first protective layer disposed on the first surface and comprising one of polyvinylidene difluoride (PVDF) or plastic; and
   a second protective layer disposed on the second surface and comprising one of PVDF or plastic, wherein the first protective layer, the second protective layer, and the polarizing layer are configured to be bent along a bend line, wherein an angle between an optical axis of the first protective layer and an optical axis of the second protective layer is smaller than 15 degrees.

2. The flexible polarizer of claim 1, wherein the first protective layer and the second protective layer both comprise PVDF.

3. The flexible polarizer of claim 2, wherein at least one of the first protective layer and the second protective layer further comprises at least one of polymethylmethacrylate (PMMA), triacetate Cellulose (TAC), polyimide (PI), polyethylene terephthalate (PET), and polypropylene (PP).

4. The flexible polarizer of claim 2, wherein at least one of the first protective layer and the second protective layer has a thickness less than 80 μm, and at least one of the first protective layer and the second protective layer has a phase retardation less than 15 nm.

5. The flexible polarizer of claim 1, wherein the first protective layer and the second protective layer respectively comprise the plastic, and materials of the plastic comprise at least one selected from a group consisting of PMMA, PI, PET, PP, polyethylene (PE), polyethylene furanoate (PEF), and polyethylene naphthalate (PEN).

6. The flexible polarizer of claim 5, wherein at least one of the first protective layer and the second protective layer has a thickness in a range from 40 um to 120 um, and at least one of the first protective layer and the second protective layer has a phase retardation in a range from 7500 nm to 12000 nm.

7. The flexible polarizer of claim 5, wherein at least one of the first protective layer and the second protective layer is an oriented layer, wherein an extrude direction of the oriented layer is perpendicular to the bend line.

8. The flexible polarizer of claim 1, wherein the first protective layer comprises PVDF, and the second protective layer comprises the plastic.

9. The flexible polarizer of claim 8, wherein the first protective layer further comprises at least one of PMMA, PI, PET, PP, and TAC.

10. The flexible polarizer of claim 8, wherein the second protective layer is the plastic, and materials of the plastic of the second protective layer comprise at least one selected from a group consisting of PMMA, PI, PET, PP, and TAC.

11. The flexible polarizer of claim 8, wherein a thickness of the first protective layer is less than 80 um, a phase retardation of the first protective layer is less than 15 nm, a thickness of the second protective layer is in a range from 40 um to 120 um, and a phase retardation of the second protective layer is in a range from 7500 nm to 12000 nm.

12. The flexible polarizer of claim 8, wherein the second protective layer is an oriented layer, wherein an extrude direction of the oriented layer is perpendicular to the bend line.

13. The flexible polarizer of claim 1, wherein the polarizing layer comprises polyvinyl alcohol (PVA).

14. A flexible touch device, comprising:
a flexible polarizer of claim 1;
a touch panel comprising a glass covering layer, a shielding layer, and a sensor layer, wherein the shielding layer is disposed between the glass covering layer and the sensor layer; and
a display module, wherein the flexible polarizer is disposed between the touch panel and the display module.

15. The flexible touch device of claim 14, wherein the first protective layer is adjacent to the touch panel, and the second protective layer is adjacent to the display module.

16. The flexible touch device of claim 14, wherein the first protective layer is adjacent to the display module, and the second protective layer is adjacent to the touch panel.

* * * * *